United States Patent
Nakajima et al.

(10) Patent No.: US 9,138,820 B2
(45) Date of Patent: Sep. 22, 2015

(54) WIRE ASPIRATION DEVICE AND WIRE RECOVERY DEVICE

(71) Applicants: Yoji Nakajima, Chiyoda-ku (JP); Tatsuya Abe, Chiyoda-ku (JP)

(72) Inventors: Yoji Nakajima, Chiyoda-ku (JP); Tatsuya Abe, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 14/131,101

(22) PCT Filed: Apr. 12, 2013

(86) PCT No.: PCT/JP2013/061108
§ 371 (c)(1),
(2) Date: Jan. 6, 2014

(87) PCT Pub. No.: WO2014/167724
PCT Pub. Date: Oct. 16, 2014

(65) Prior Publication Data
US 2014/0305908 A1    Oct. 16, 2014

(51) Int. Cl.
*B23H 7/10* (2006.01)

(52) U.S. Cl.
CPC ..................................... *B23H 7/108* (2013.01)

(58) Field of Classification Search
CPC .............. B23H 5/00; B23H 7/00; B23H 1/04; B23H 7/30; B23H 9/24; B23H 9/30; B23H 11/12; B23H 7/10; B23H 7/108; B23K 11/06
USPC ...................... 219/69.12, 69.15, 69.2, 81–84, 219/469–470; 226/97.1–97.4
See application file for complete search history.

(56) References Cited

U.S. PATENT DOCUMENTS

| | | | | |
|---|---|---|---|---|
| 5,045,662 A * | 9/1991 | Yamada | ...................... | 219/69.12 |
| 5,523,538 A * | 6/1996 | Matsuda | .................... | 219/69.12 |
| 5,874,702 A * | 2/1999 | Hayakawa | .................. | 219/69.12 |

(Continued)

FOREIGN PATENT DOCUMENTS

| EP | 1 602 433 A1 | 12/2005 |
|---|---|---|
| EP | 1 611 985 A1 | 1/2006 |

(Continued)

OTHER PUBLICATIONS

International Search Report for PCT/JP2013/061108 dated Jun. 18, 2013.

*Primary Examiner* — Dana Ross
*Assistant Examiner* — Michael Laflame, Jr.
(74) *Attorney, Agent, or Firm* — Sughrue Mion, PLLC; Richard C. Turner

(57) ABSTRACT

A wire aspiration device includes a first member having a first curved surface with a projected portion that is in close contact with peripheral surfaces of first and second recovery rollers on one side, a second member having a second curved surface with a projected portion that is in close contact with the peripheral surfaces of the first and second recovery rollers on the other side, and a third member having a through hole formed in a central portion thereof to cause the ejected wire electrode to run in the wire-electrode recovering direction and coupling the first and second members to form two grooves between the first and second curved surfaces to be in contact with the through hole, wherein a fluid spout for spouting a fluid into the through hole in the recovering direction is formed in any of the first, second, and third members.

14 Claims, 9 Drawing Sheets

(56) References Cited

U.S. PATENT DOCUMENTS

| | | | |
|---|---|---|---|
| 6,078,019 A * | 6/2000 | Medici et al. | 219/69.12 |
| 6,209,432 B1 * | 4/2001 | Matsuda | 83/342 |
| 6,815,630 B1 * | 11/2004 | Ishihara et al. | 219/69.12 |
| 7,230,200 B2 * | 6/2007 | Wehrli | 219/69.12 |
| 7,923,656 B2 * | 4/2011 | Lai | 219/69.12 |
| 2003/0057187 A1 * | 3/2003 | Baiardi et al. | 219/69.12 |
| 2011/0239452 A1 | 10/2011 | Yang | |

FOREIGN PATENT DOCUMENTS

| | | |
|---|---|---|
| JP | 2-59221 A | 2/1990 |
| JP | 5-2830 U | 1/1993 |
| JP | 6-46833 U | 6/1994 |
| JP | 7-1246 A | 1/1995 |
| JP | 2000-296416 A | 10/2000 |
| JP | 2006-224215 A | 8/2006 |

* cited by examiner

WIRE ASPIRATION DEVICE AND WIRE RECOVERY DEVICE

CROSS REFERENCE TO RELATED APPLICATIONS

This application is a National Stage of International Application No. PCT/2013/061108 filed Apr. 12, 2013, the contents of which are incorporated herein by reference in their entirety.

FIELD

The present invention relates to a wire aspiration device and a wire recovery device for recovering a wire in a wire electric discharge machine.

BACKGROUND

A wire electric discharge machine generally includes a wire electrode holder including a wire electrode bobbin around which a wire electrode is wound, a wire-electrode automatic-connection device including a wire-electrode feed roller that feeds the wire electrode and a guide pipe that guides the wire electrode to an upper wire-electrode guide unit, the upper wire-electrode guide unit including an upper power feed contact that feeds a current while contacting the wire electrode and an upper die that holds the wire electrode during machining, a lower wire-electrode guide unit including a lower power feed contact that feeds a current while contacting the wire electrode and a lower die that holds the wire electrode during machining, a wire-electrode feeding unit including a lower roller that changes the direction of the wire electrode and an aspirator that spouts a fluid facilitating a conveyance of the wire electrode to a wire-electrode recovery unit, the wire-electrode recovery unit including a wire-electrode recovery roller that recovers the wire electrode and a wire-electrode recovery-pipe end that separates the wire electrode and the fluid from each other, and the like. The wire electric discharge machine generates electric discharge by applying a pulse voltage between the wire electrode and a workpiece while recovering the wire electrode, thereby machining the workpiece into an arbitrary shape like a jig saw while relatively moving the workpiece and the upper and lower wire-electrode guide units.

A wire electrode having a diameter of 0.3 millimeter to 0.1 millimeter is generally used and automatically fed by the wire-electrode automatic-connection device through the upper wire-electrode guide unit, a machining start hole of a workpiece, the lower wire-electrode guide unit, and the lower roller unit to the wire-electrode recovery unit, thereby completing the connection. However, when a wire electrode having a diameter smaller than 0.1 millimeter is used, the wire electrode is adversely wound around the recovery roller due to adherence of the fluid facilitating the conveyance to the recovery roller.

CITATION LIST

Patent Literatures

Patent Literature 1: Japanese Patent Application Laid-open No. 2006-224215
Patent Literature 2: Japanese Patent Application Laid-open No. 02-059221
Patent Literature 3: Japanese Patent Application Laid-open No. 07-001246

SUMMARY

Technical Problem

For example, in the technique described in Patent Literature 1, recovery rollers are opened and a wire electrode is conveyed by a pipe that guides the wire electrode to an ejector to prevent winding of the wire electrode around the recovery rollers at the time of insertion of the wire electrode. In this case, a complicated mechanism that moves the pipe is used, which easily causes a problem.

In the technique described in Patent Literature 2, while a used wire electrode after wire machining can be ejected to a wire recovery box or the like by an aspiration power at an inlet portion of the aspiration mechanism and a conveyance power at an outlet portion thereof caused by a fluid of an aspiration mechanism, a mechanism for preventing winding of the wire electrode around recovery rollers is not particularly provided.

Patent Literature 3 describes that, by sharpening a peripheral wall of a wire entrance of a guide tube into a shape having a high degree of close contact with recovery rollers, an open end of the wire entrance can be brought quite close to the recovery rollers and a wire can be efficiently aspirated. However, when the open end of the wire entrance is brought quite closer to the recovery rollers, a flow of air near the wire entrance is lost due to blockage of an air inlet, which prevents an end of the wire electrode wound around the recovery rollers from being aspirated. When the guide tube is not sharpened, a flow of air is produced by aspiration power; however, the flow is not reliably transmitted to the wire electrode and thus the end of the wire electrode is wound around the recovery rollers.

The present invention has been achieved in view of these problems, and an object of the present invention is to provide a wire aspiration device and a wire recovery device that can reliably prevent a wire electrode from winding around recovery rollers with a simple configuration.

Solution to Problem

In order to solve the aforementioned problems, a wire aspiration device according to one aspect of the present invention that is placed on an ejection side of first and second recovery rollers that nip a wire electrode having run through an area where a workpiece is subject to electric discharge machining from both sides of the wire electrode and ejects the wire electrode, and that aspirates the ejected wire electrode in a recovering direction, the wire aspiration device is configured to include: a first member having a first curved surface with a projecting portion that is in close contact with peripheral surfaces of the first and second recovery rollers on one side; a second member having a second curved surface with a projecting portion that is in close contact with the peripheral surfaces of the first and second recovery rollers on the other side; and a third member having a through hole formed in a central portion thereof to cause the ejected wire electrode to run in the recovering direction, and coupling the first and second members to form two grooves for forming an air gap with the peripheral surfaces of the first and second recovery rollers between the first and second curved surfaces to be in contact with the through hole, wherein a fluid spout for spouting a fluid into the through hole in the recovering direction is formed in any one of the first, second, and third members.

Advantageous Effects of Invention

The wire aspiration device according to the present invention can prevent winding of a wire electrode around wire-electrode recovery rollers to ensure recovery of a wire electrode.

DESCRIPTION OF EMBODIMENTS

Exemplary embodiments of a wire aspiration device and a wire recovery device according to the present invention will be explained below in detail with reference to the accompanying drawings. The present invention is not limited to the embodiments.

First Embodiment

Figure 1:
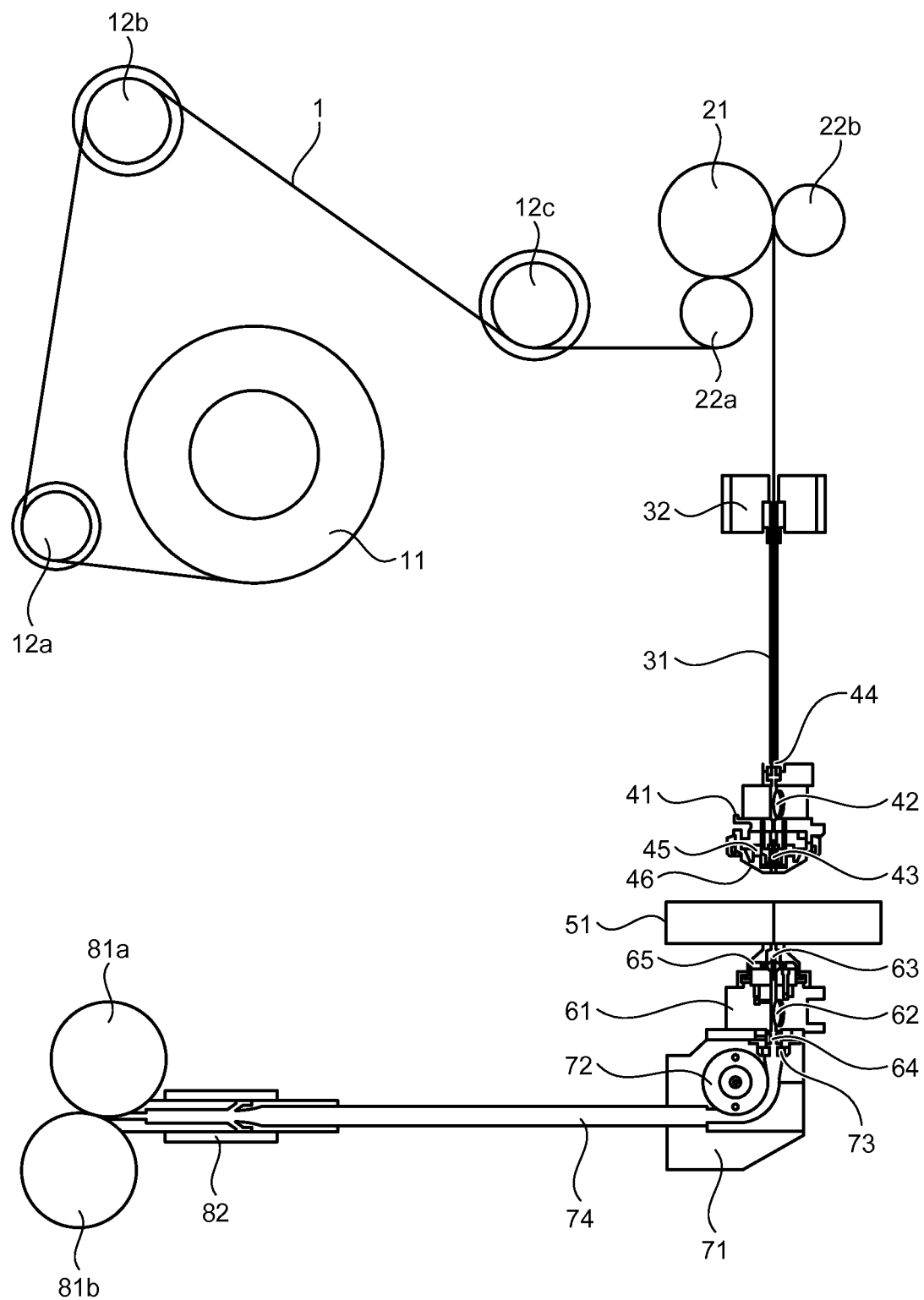
FIG. 1 depicts a configuration of a wire electric discharge machine according to a first embodiment of the present invention.

FIG. 1 depicts a configuration of the wire electric discharge machine according to the first embodiment of the present invention. As shown in FIG. 1, the wire electric discharge machine includes a wire electrode holder including a wire electrode bobbin 11 around which a wire electrode 1 is wound, and pulleys 12a, 12b, and 12c that change the direction of the wire electrode 1. The wire electric discharge machine also includes an upper wire-electrode guide unit including an upper wire-electrode guide block 41, an upper power feed contact 42 that feeds a current while contacting the wire electrode 1, an upper die 43 that holds the wire electrode 1 during machining, an upper guide 44 that facilitates contact of the wire electrode 1 with the upper power feed contact 42, a jet nozzle 45 that spouts a jet fluid for guiding the wire electrode 1 through a machining start hole of a workpiece 51 to a lower wire-electrode guide unit, and an upper machining fluid nozzle 46 that squirts a machining fluid to the workpiece 51 during the machining. The wire electric discharge machine also includes a wire-electrode automatic-connection device including a wire-electrode feed roller 21 that feeds the wire electrode 1, wire-electrode-feed pinch rollers 22a and 22b that hold the wire electrode 1 to be wound around the wire-electrode feed roller 21, a guide pipe 31 that guides the wire electrode 1 to the upper wire-electrode guide unit, and a guide-pipe head 32 that flows a fluid through the guide pipe. The wire electric discharge machine also includes a lower wire-electrode guide unit including a lower wire-electrode guide block 61, a lower power feed contact 62 that feeds a current while contacting the wire electrode 1, a lower die 63 that holds the wire electrode 1 during the machining, a lower guide 64 that facilitates contact of the wire electrode 1 with the lower power feed contact 62, and a lower machining fluid nozzle 65 that squirts a machining fluid to the workpiece 51 during the machining. The wire electric discharge machine also includes a wire-electrode recovery unit formed by wire-electrode recovery rollers 81a and 81b that recover the wire electrode 1, and a wire-electrode recovery-pipe end 82 that separates the wire electrode 1 and the fluid from each other. The wire electric discharge machine also includes a wire-electrode feeding unit including a lower roller block 71, a lower roller 72 that changes the direction of the wire electrode 1, an aspirator 73 that generates a negative voltage facilitating the conveyance of the wire electrode 1 from the lower die 63 to the lower guide 64 and also spouts a fluid facilitating the conveyance of the wire electrode 1 to the wire-electrode recovery unit, and a lower guide pipe 74 that guides the wire electrode 1 to the wire-electrode recovery unit. The wire electric discharge machine generates electric discharge by applying a pulse voltage between the wire electrode 1 and the workpiece 51 while recovering the wire electrode 1, and machines the workpiece into an arbitrary shape like a jig saw while relatively moving the workpiece 51 and the upper and lower wire-electrode guides.

In the present embodiment, the wire electrode 1 that is 0.3 millimeter to 0.1 millimeter in diameter and also less than 0.1 millimeter in diameter is used. The wire electrode 1 is automatically fed by the wire-electrode automatic-connection device through the upper wire-electrode guide unit, the machining start hole of the workpiece 51, the lower wire-electrode guide unit, and the lower roller unit to the wire-electrode recovery unit, thereby completing connection.

Figure 2:
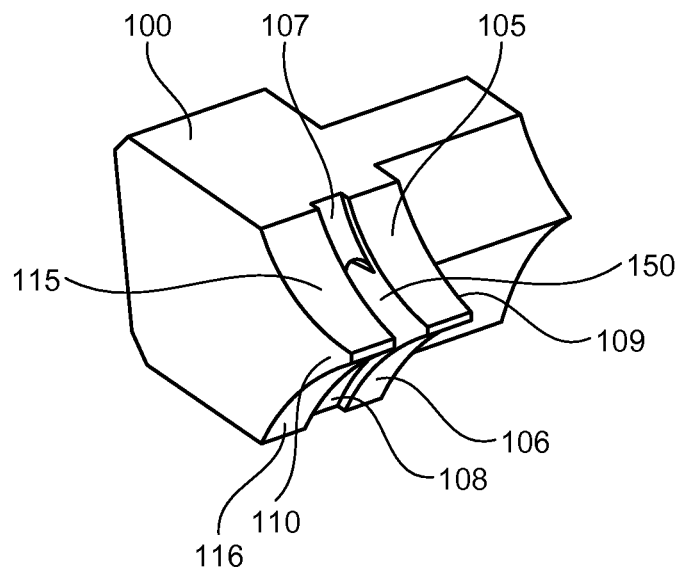
FIG. 2 is a perspective view of an aspirator serving as a wire aspiration device according to the first embodiment.
Figure 3:
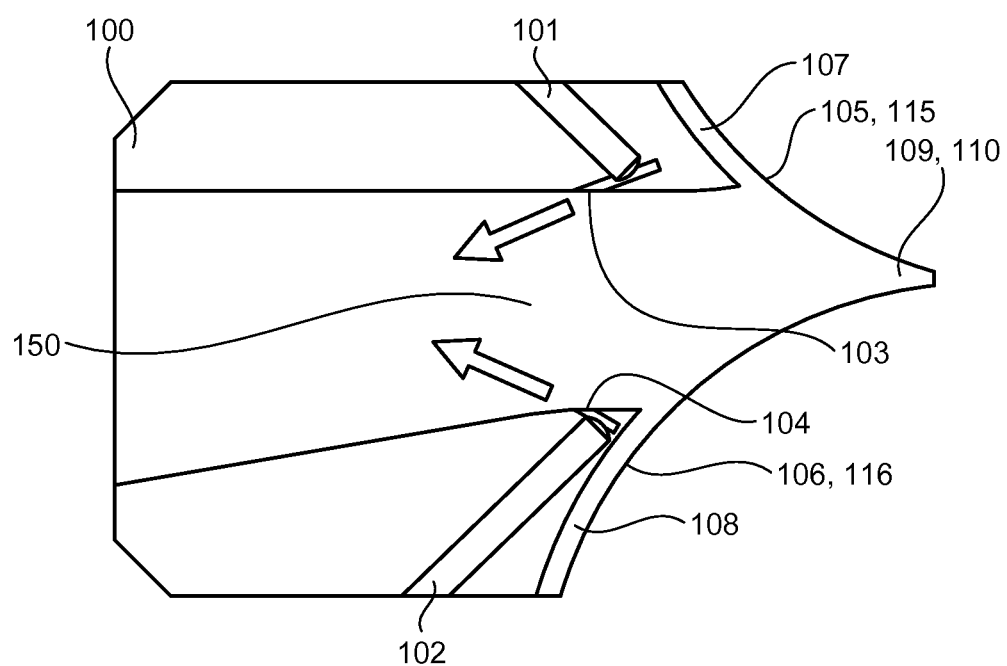
FIG. 3 is a cross-sectional view of the aspirator according to the first embodiment as viewed from a direction of rotation axes of wire-electrode recovery rollers.

FIG. 2 is a perspective view of an aspirator 100 serving as the wire aspiration device according to the present embodiment and FIG. 3 is a cross-sectional view of the aspirator 100 as viewed from the direction of rotation axes of the wire-electrode recovery rollers 81a and 81b. In the aspirator 100, a first member 109 has curved surfaces 105 and 106 in shapes that can be brought into close contact with cylindrical peripheral surfaces of the wire-electrode recovery rollers 81a and 81b, respectively, on one side, and a second member 110 similarly has curved surfaces 115 and 116 in shapes that can be brought into close contact with the cylindrical peripheral surfaces, respectively, on the other side. The curved surfaces 105 and 115 have the same shapes as that of the peripheral surface of the wire-electrode recovery roller 81a and the curved surfaces 106 and 116 have the same shapes as that of the peripheral surface of the wire-electrode recovery roller 81b. The curved surfaces 105 and 106 form a first curved surface across a projecting portion and the curved surfaces 115 and 116 form a second curved surface across a projecting portion.

Furthermore, an aspiration groove 107 between the curved surfaces 105 and 115 and an aspiration groove 108 between the curved surfaces 106 and 116 are formed to have constant widths in the rotation axis direction of the wire-electrode recovery rollers 81a and 81b, respectively. As long as the first member 109 and the second member 110 can be brought into close contact with the cylindrical peripheral surfaces of the wire-electrode recovery rollers 81a and 81b, the widths of the aspiration grooves 107 and 108 in the rotation axis direction are not necessarily constant. A through hole 150 located between the first member 109 and the second member 110 is formed between the aspiration grooves 107 and 108, through which the aspirated wire electrode 1 can run from an ejection side of the wire-electrode recovery rollers 81a and 81b in a recovering direction. The first member 109, the second member 110, and a member (third member) that couples the first and second members and forms the aspiration grooves 107 and 108 can be separate members or integrally formed.

Figure 4:
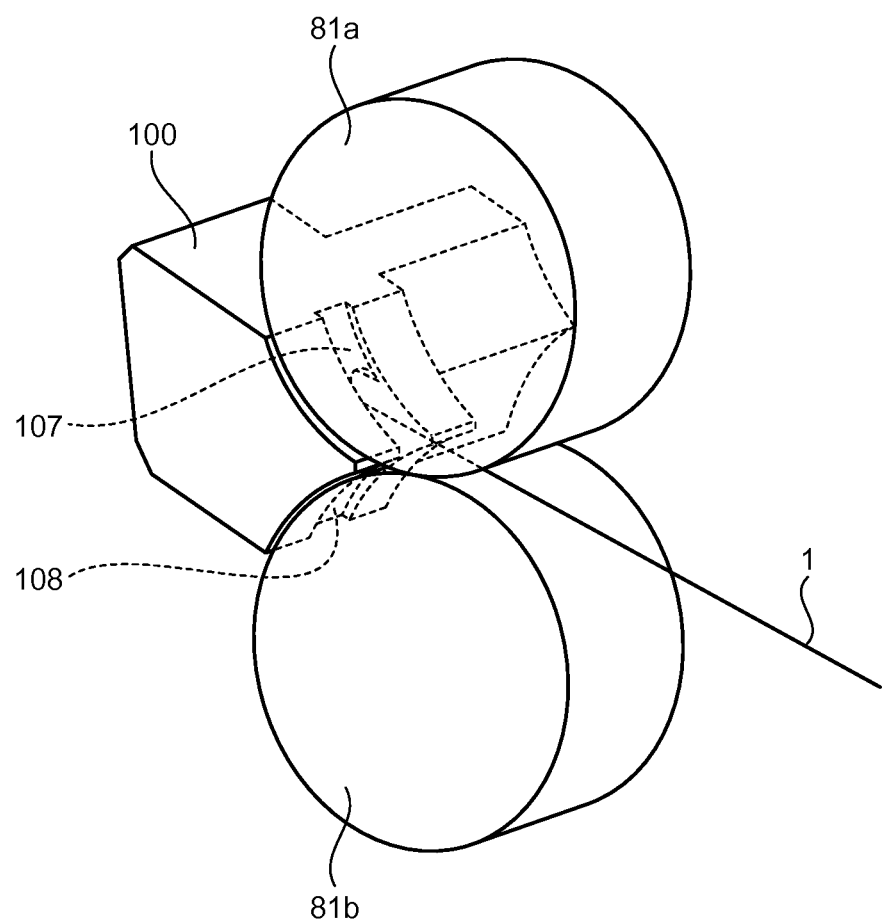
FIG. 4 is a perspective view of a state where the aspirator according to the first embodiment is used in close contact with the wire-electrode recovery rollers.
Figure 5:
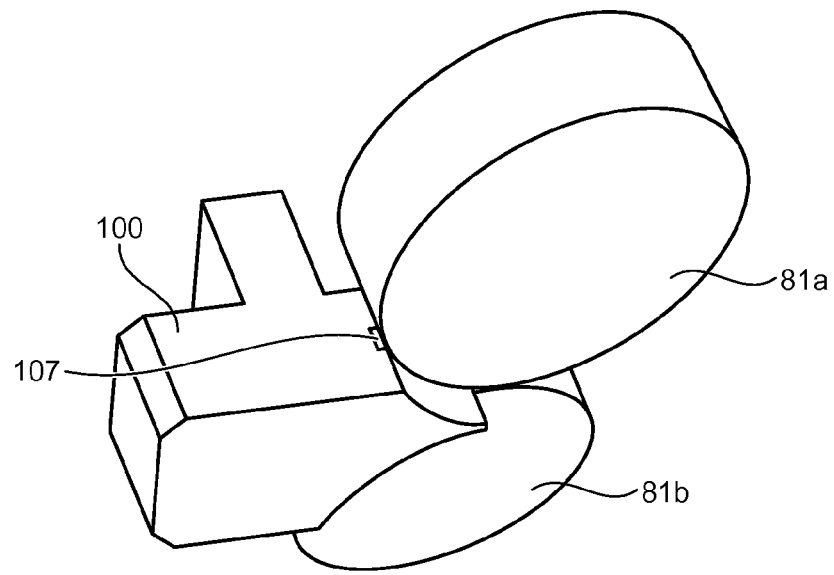
FIG. 5 is another perspective view of a state where the aspirator according to the first embodiment is used in close contact with the wire-electrode recovery rollers.
Figure 6:
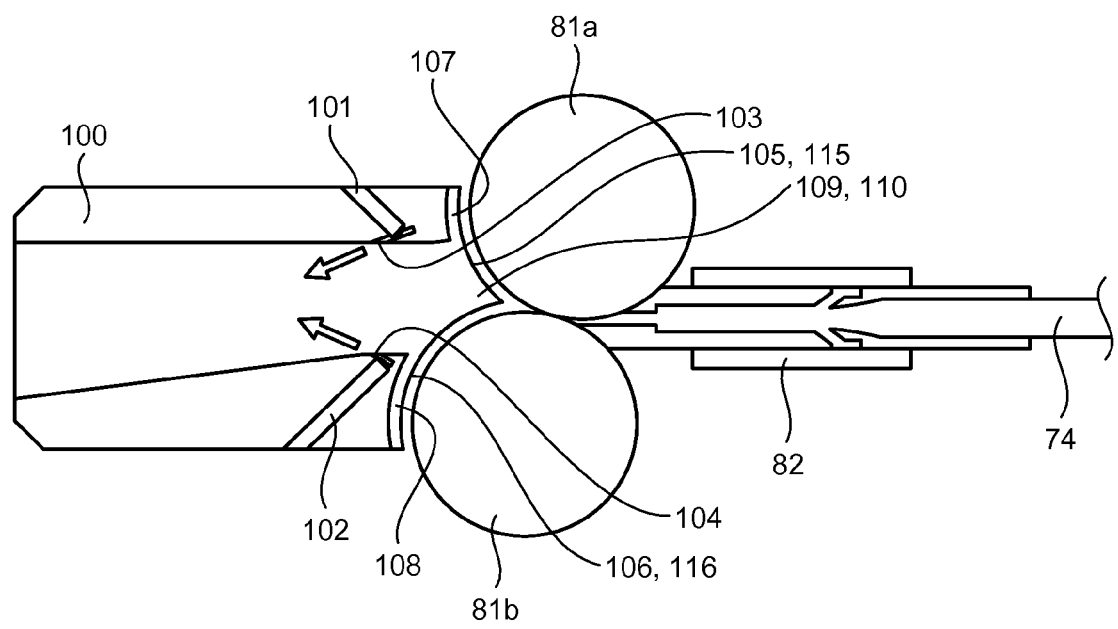
FIG. 6 depicts the wire-electrode recovery rollers as viewed from a rotation axis direction in a state where the aspirator according to the first embodiment is used in close contact with the wire-electrode recovery rollers.

The aspirator 100 is used in close contact with the wire-electrode recovery rollers 81a and 81b shown in FIG. 1. FIGS. 4 and 5 are perspective views of the aspirator 100 in this state and FIG. 6 depicts the wire-electrode recovery rollers 81a and 81b as viewed from the rotation axis direction. The aspirator 100 and the wire-electrode recovery rollers 81a and 81b constitute a wire recovery device.

In the member (third member) that couples the first member 109 and the second member 110 and forms the aspiration grooves 107 and 108, compressed-air introducing holes 101 and 102 are formed, through which compressed air can be flowed from outside. Furthermore, compressed-air jetting holes 103 and 104 facing in the direction of wire electrode recovery (ejection) are formed on a side surface of the third member on the side of the through hole 150.

Before the wire electrode 1 is conveyed to the wire recovery device, compressed air is flowed in the compressed-air introducing holes 101 and 102 and the compressed air is spouted from the compressed-air jetting holes 103 and 104, thereby generating a negative pressure at an entry of the through hole 150 of the aspirator 100 serving as the aspiration mechanism. When the negative pressure is generated, external air flows into the aspiration grooves 107 and 108 provided in the aspirator 100 and thus a flow of fluid flow occurs along peripheral walls of the wire-electrode recovery rollers 81a and 81b in such a manner that the wire electrode 1 falls off the wire-electrode recovery roller 81a or 81b. The end portion of the wire electrode 1 that almost winds around the wire-electrode recovery roller 81a or 81b is conveyed by the fluid flow to the ejection side of the aspirator 100 without winding around the wire-electrode recovery roller 81a or 81b.

The compressed-air introducing holes and the compressed-air jetting holes are not necessarily formed in the third member and can be formed in the first member 109 and the second member 110. Two or more compressed-air jetting holes can be formed as long as the compressed-air jetting holes serving as fluid spouts face in the wire-electrode recovering direction. While the compressed air is used to generate a negative pressure, the fluid is not limited to the compressed air and any fluid that can generate a negative pressure at the entry of the through hole 150 can be used.

Furthermore, when the aspirator 100 is bought quite close to the wire-electrode recovery rollers 81a and 81b, flows of the external air are concentrated only to those along the aspiration grooves 107 and 108, thereby reinforcing prevention of winding of the wire electrode 1. Furthermore, when the compressed air is flowed in the aspirator 100 even during the wire electric discharge machining, winding around the wire-electrode recovery rollers 81a and 81b can be prevented.

Figure 7:
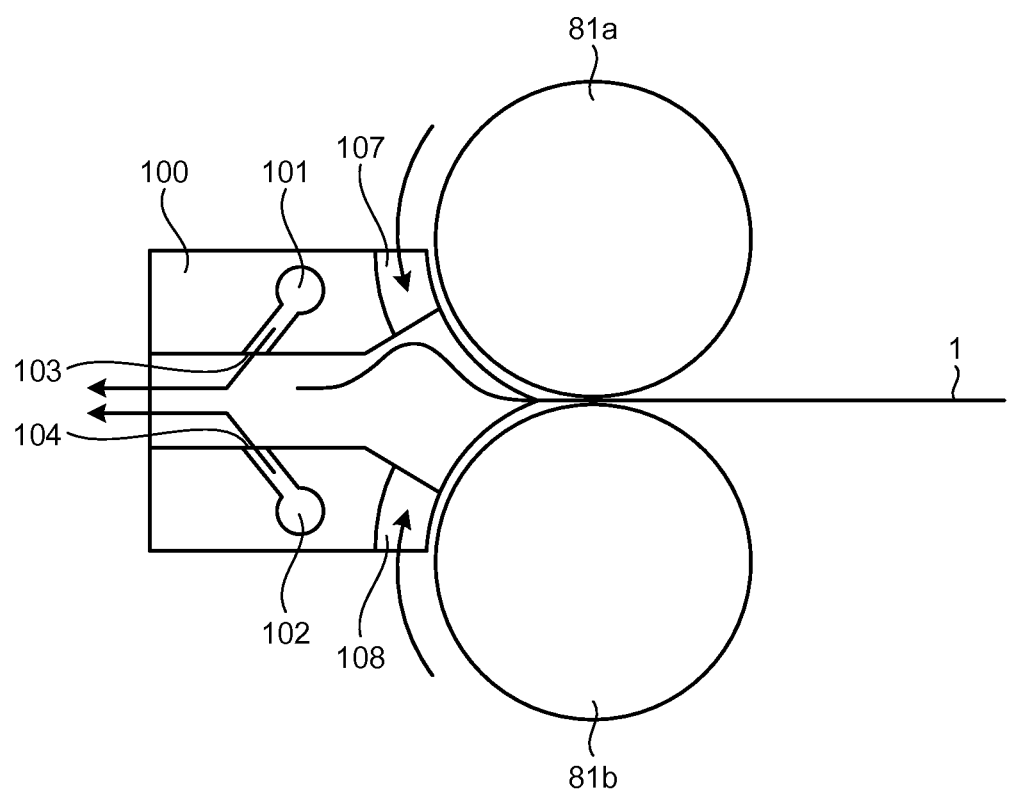
FIG. 7 is a pattern diagram for explaining an operation of a wire recovery device according to the first embodiment.

This operation is explained in detail with reference to FIG. 7, which is a schematic diagram for explaining the operation of the wire recovery device according to the present embodiment. The compressed air is flowed in the compressed-air introducing holes 101 and 102 and the compressed air is spouted from the compressed-air jetting holes 103 and 104 facing in the direction of wire electrode ejection, thereby generating a negative pressure at the entry of the aspirator 100. The wire electrode 1 nipped by the wire-electrode recovery rollers 81a and 81b on the both sides and conveyed to the wire recovery device almost winds around the wire-electrode recovery roller 81a or 81b. However, due to the flows of external air flowing along the aspiration grooves 107 and 108 formed between the first member 109 and the second member 110, the wire electrode 1 is pulled away from the wire-electrode recovery roller 81a or 81b and is prevented from winding therearound. The wire electrode 1 is then aspirated into an area at the negative pressure in the through hole 150 of the aspirator 100, passed through the through hole 150, and conveyed to the left side in FIG. 7, that is, the ejection side (the recovering direction) of the aspirator 100.

As shown in FIG. 2, flows at the both ends of each of the aspiration grooves 107 and 108 formed between the first member 109 and the second member 110 that can be brought into close contact with the wire-electrode recovery rollers 81a and 81b are interrupted by the first member 109 and the second member 110 so that the flows of external air from the rotation axis direction of the wire-electrode recovery rollers 81a and 81b are blocked. Accordingly, flows of the external air can be concentrated only to those along the aspiration grooves 107 and 108 and thus the wire electrode 1 can be pulled away from the wire-electrode recovery rollers 81a and 81b to prevent winding therearound as explained with reference to FIG. 7. When the effect of interrupting external air from the both sides due to presence of the first member 109 and the second member 110 is expected, the aspiration power is enhanced. Therefore, while the aspiration grooves 107 and 108 can have arbitrary widths in the rotation axis direction of the wire-electrode recovery rollers 81a and 81b (in the direction perpendicular to the sheet plane of FIG. 7), a width corresponding to the maximum range of movement in the corresponding rotation axis direction of the wire electrode 1 carried out of the wire-electrode recovery rollers 81a and 81b suffices. When the widths of the aspiration grooves 107 and 108 are limited to the maximum range of movement of the wire electrode 1 in the corresponding rotation axis direction, the aspiration power can be increased and the pulling-away effect of the external air flows along the aspiration grooves 107 and 108 can be further enhanced.

Second Embodiment

Figure 8:
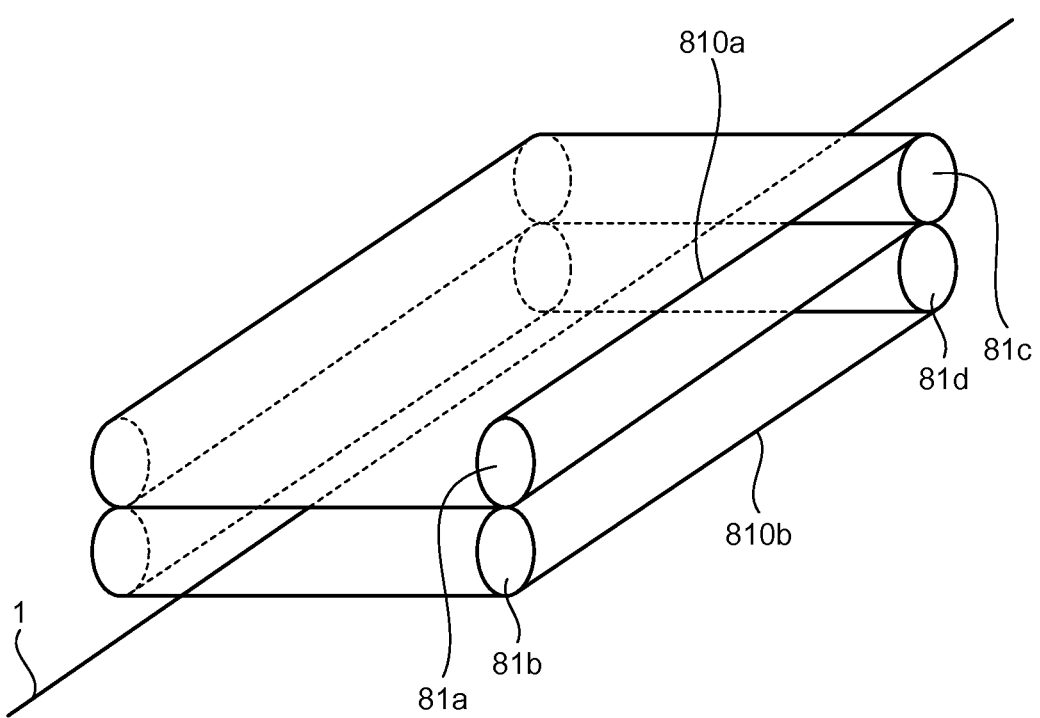
FIG. 8 depicts wire-electrode recovering conveyer belts according to a second embodiment.

While the case where the mechanism for nipping the wire electrode 1 to be conveyed to the aspirator 100 is formed by the wire-electrode recovery rollers 81a and 81b is explained in the first embodiment, the mechanism that nips and conveys the wire electrode 1 is not limited thereto. In the present embodiment, the mechanism for nipping and conveying the wire electrode 1 in the wire recovery device of the wire electric discharge machine is formed by wire-electrode-recovering conveyer belts 810a and 810b (hereinafter may be referred to just as "recovering conveyer belts") as shown in FIG. 8, instead of the wire-electrode recovery rollers 81a and 81b shown in FIG. 1. The recovering conveyer belts 810a and 810b are laid in tensioned states across the wire-electrode recovery roller 81a and a wire-electrode recovery roller 81c, and the wire-electrode recovery roller 81b and a wire-electrode recovery roller 81d, respectively. The wire-electrode recovery rollers 81a and 81b hold the recovering conveyer belts 810a and 810b in the tensioned states on the ejection side of the wire electrode 1, respectively. The wire electrode 1 is nipped by the recovering conveyer belts 810a and 810b from the both sides (in the vertical direction) and drawn to be ejected to the aspirator 100 installed as shown in FIG. 9.

Figure 9:
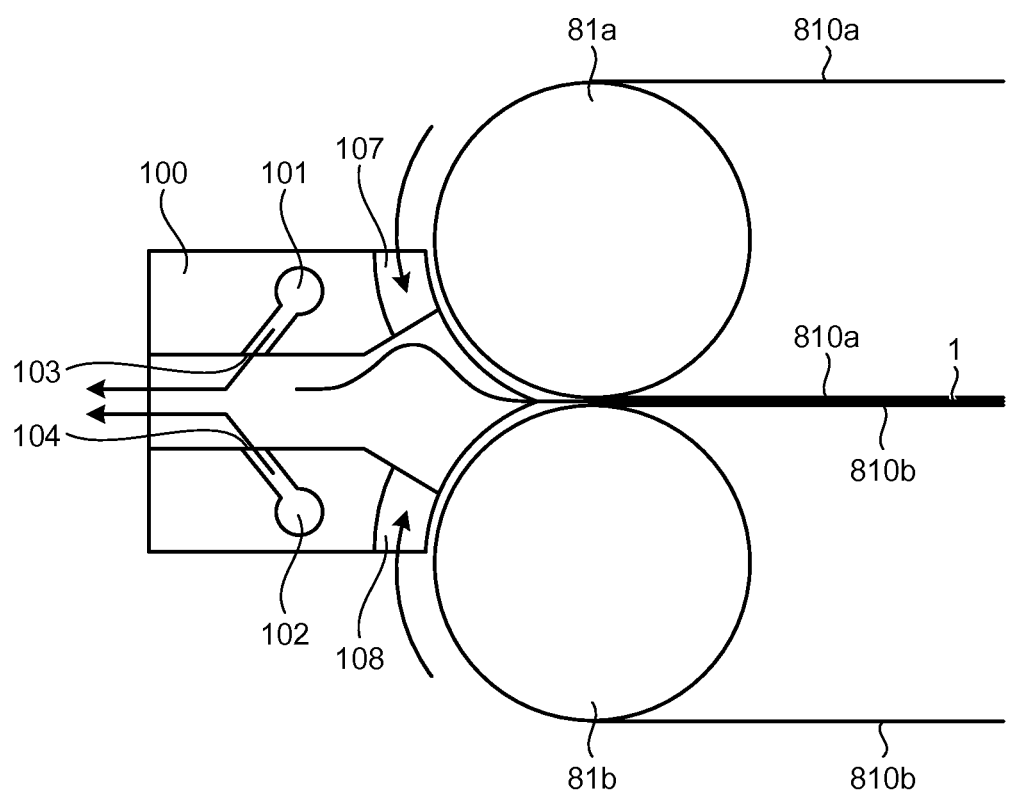
FIG. 9 depicts the wire-electrode recovering conveyer belts as viewed from a rotation axis direction in a state where an aspirator according to the second embodiment is used in close contact with the wire-electrode recovering conveyer belts.

The wire electrode 1 nipped and conveyed by the recovering conveyer belts 810a and 810b is aspirated into an area where the recovering conveyer belts 810a and 810b are held by the wire-electrode recovery rollers 81a and 81b, by the aspirator 100 that is brought into close contact therewith as shown in FIG. 9 and is recovered. The aspirator 100 shown in FIG. 9 has the same configuration as that explained in the first embodiment. While the wire electrode 1 almost winds around the recovering conveyer belt 810a or 810b in the area where the belts are held by the wire-electrode recovery rollers 81a and 81b, the wire electrode 1 is pulled away from the area of the recovering conveyer belts 810a and 810b by flows of external air flowing along the aspiration grooves 107 and 108 formed between the first member 109 and the second member 110 and is prevented from winding therearound.

Third Embodiment

Figure 10:
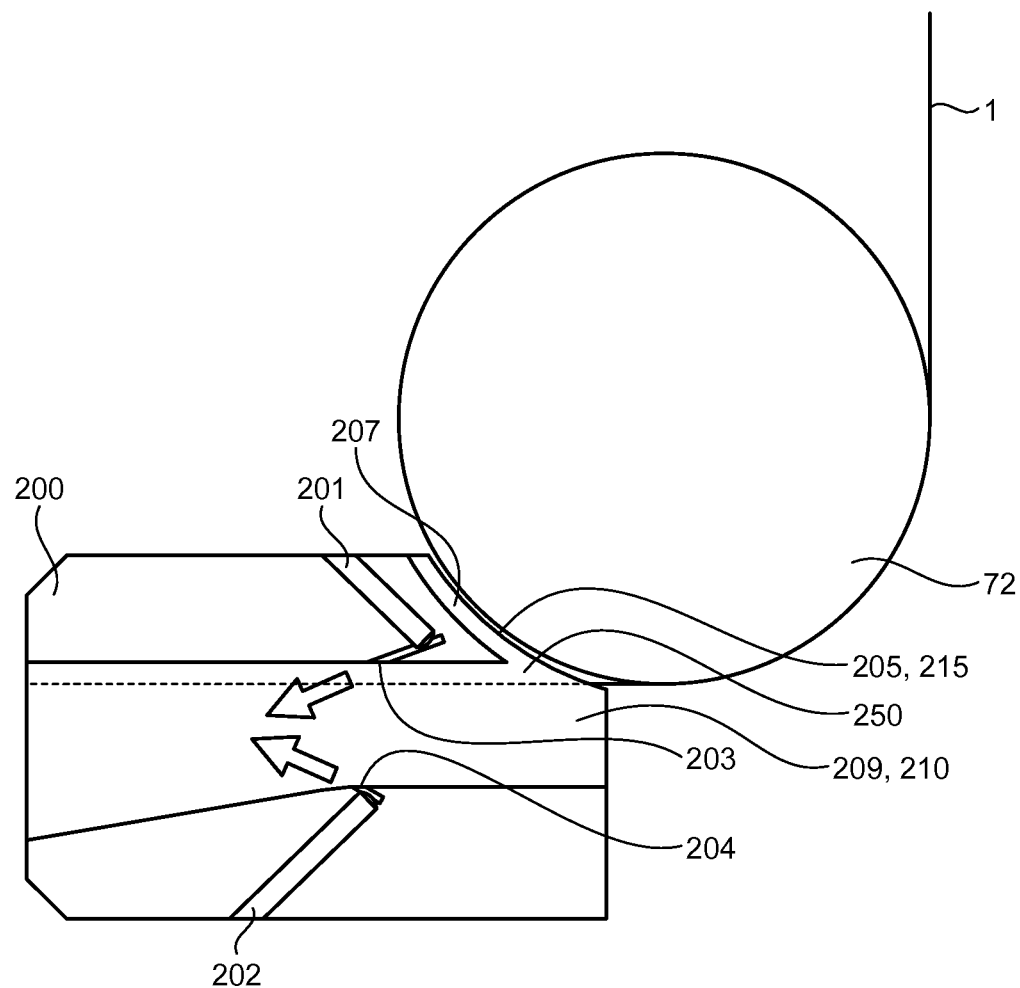
FIG. 10 depicts a lower roller as viewed from a rotation axis direction in a state where an aspirator according to a third embodiment is used in close contact with the lower roller.
Figure 11:
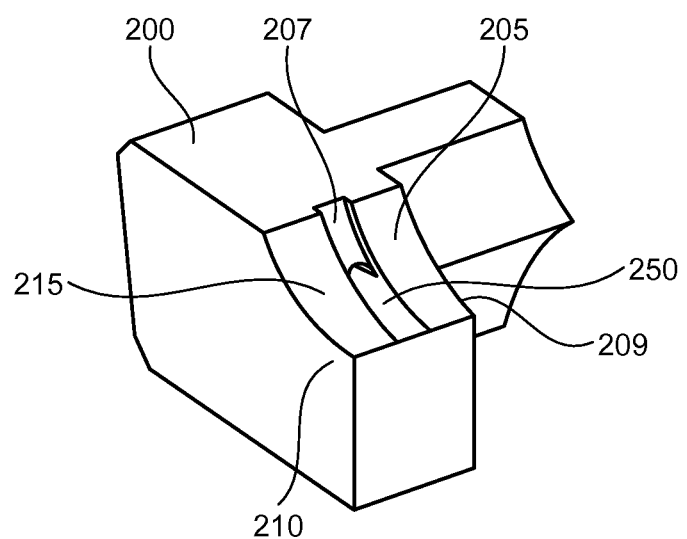
FIG. 11 is a perspective view of the aspirator serving as a wire aspiration device according to the third embodiment.

The method of providing the aspiration grooves in the aspirator 100 on curved surfaces that can face in close contact with cylindrical shapes, explained in the above embodiments, can be applied not only to the wire recovery device but also to a wire aspiration device installed at the subsequent stage of the lower roller 72 that changes the direction of the wire electrode 1 of the wire electric discharge machine shown in FIG. 1. FIG. 10 is an example of an aspirator 200 serving as such a wire aspiration device. FIG. 11 is a perspective view of the aspirator 200.

Instead of the curved surfaces having the projecting portions that can face in close contact with the two cylindrical shapes as the aspirator 100, the aspirator 200 has curved surfaces 205 and 215 that can face in close contact with the cylindrical shape of the lower roller 72 on a first member 209 and a second member 210, respectively, as shown in FIG. 11.

Furthermore, an aspiration groove 207 having a constant width in the direction of a rotation axis of the lower roller 72 is formed between the curved surfaces 205 and 215. When the curved surfaces 205 and 215 can be brought into close contact with a cylindrical peripheral surface of the lower roller 72 by the first member 209 and the second member 210, the width of the aspiration groove 207 in the corresponding rotation axis direction is not necessarily constant. A through hole 250 is formed between the first member 209 and the second member 210 to be in contact with the aspiration groove 207, through which the wire electrode 1 aspirated in the through hole 250 can run from an ejection side of the lower roller 72 in a conveying direction (leftward in FIG. 10). The first member 209, the second member 210, and a member (third member) that couples these members to form the aspiration groove 207 can be separate members or integrally formed.

As shown in FIG. 10, compressed-air introducing holes 201 and 202 are formed in the member (third member) that couples the first member 209 and the second member 210 and forms the aspiration groove 207, through which compressed air can be flowed from outside. Furthermore, compressed-air jetting holes 203 and 204 facing in the wire-electrode conveying direction are formed on a side surface of the third member on the side of the through hole 250.

The aspirator 200 is used in close contact with the lower roller 72 as shown in FIG. 10. Compressed air is flowed in the compressed-air introducing holes 201 and 202 of the aspirator 200 and the compressed air is spouted from the compressed-air jetting holes 203 and 204 facing in the wire-electrode delivery direction, thereby generating a negative pressure at an entry of the through hole 250 of the aspirator 200 serving as an aspiration mechanism. When the negative pressure is generated, external air flows in the aspiration groove 207 provided in the aspirator 200, so that a fluid flow occurs along the peripheral wall of the lower roller 72 to pull the wire electrode 1 away from the lower roller 72. An end of the wire electrode 1 that almost winds around the lower roller 72 in an upper part of FIG. 10 is conveyed by the fluid flow to the ejection side of the aspirator 200 without winding around the lower roller 72. The formation positions and numbers of the compressed-air introducing holes and the compressed-air jetting holes, and the type of the fluid for generating a negative pressure are not limited to those described above.

Furthermore, similarly to the first embodiment, when the aspirator 200 is brought quite close to the lower roller 72, flows of external air are concentrated only to one along the aspiration groove 207 and thus prevention of winding of the wire electrode 1 is reinforced. Furthermore, when the compressed air is flowed in the aspirator 200 also during the wire electric discharge machining, winding around the lower roller 72 can be prevented. When an effect of interrupting the external air from both sides of the aspiration groove 207 is expected due to the presence of the first member 209 and the second member 210 that sandwich the aspiration groove 207 from both sides in the axial direction of the lower roller 72, aspiration power is enhanced. Therefore, while the aspiration groove 207 has an arbitrary width in the rotation axis direction of the lower roller 72 (the direction perpendicular to the sheet plane of FIG. 10), a width corresponding to the maximum range of movement in the corresponding rotation axis direction of the wire electrode 1 carried out of the lower roller 72 suffices. When the width of the aspiration groove 207 is limited to the maximum range of movement of the wire electrode 1 in the rotation axis direction, the suction power can be enhanced and thus the pulling-away effect of the external air flow along the aspiration groove 207 can be further increased.

Further, the invention of the present application is not limited to the above embodiments, and when the present invention is carried out, the invention can be variously modified without departing from the scope thereof. In addition, in the above embodiments, inventions of various stages are included, and various inventions can be extracted by appropriately combining a plurality of constituent elements disclosed herein. For example, even when some constituent elements are omitted from all the constituent elements described in the embodiments, as far as the problems mentioned in the section of "Solution to problem" can be solved and effects mentioned in the section of Advantageous Effects of Invention are obtained, the configuration from which these constituent elements have been omitted can be extracted as an invention. Furthermore, constituent elements common to different embodiments can be appropriately combined.

INDUSTRIAL APPLICABILITY

As described heretofore, the wire aspiration device and the wire recovery device according to the present invention are useful in preventing winding of a wire electrode to be used in a wire electric discharge machine around a roller, and is particularly suitable as a wire aspiration device and a wire recovery device that perform aspiration of a wire electrode less than 0.1 millimeter in diameter with an aspirator.

REFERENCE SIGNS LIST 1 wire electrode, 11 wire electrode bobbin, 12a, 12b, 12c pulley, 21 wire-electrode feed roller, 22a, 22b wire-electrode-feed pinch roller, 31 guide pipe, 32 guide-pipe head, 41 upper wire-electrode guide block, 42 upper power feed contact, 43 upper die, 44 upper guide, 45 jet nozzle, 46 upper machining fluid nozzle, 51 workpiece, 61 lower wire-electrode guide block, 62 lower power feed contact, 63 lower die, 64 lower guide, 65 lower machining fluid nozzle, 71 lower roller block, 72 lower roller, 73, 100, 200 aspirator, 74 lower guide pipe, 81a, 81b wire-electrode recovery roller, 82 wire-electrode recovery-pipe end, 101, 102, 201, 202 compressed-air introducing hole, 103, 104, 203, 204 compressed-air jetting hole, 105, 106, 115, 116, 205, 215 curved surface, 107, 108, 207 aspiration groove, 109, 209 first member, 110, 210 second member, 150, 250 through hole, 810a, 810b recovering conveyer belt.

The invention claimed is:

1. A wire aspiration device that is placed on an ejection side of first and second recovery rollers that nip a wire electrode having run through an area where a workpiece is subject to electric discharge machining from both sides of the wire electrode and ejects the wire electrode, and that aspirates the ejected wire electrode in a recovering direction, the wire aspiration device comprising:
   a first member having a first curved surface with a projecting portion that is in close contact with peripheral surfaces of the first and second recovery rollers, the first member being on one side of a third member;
   a second member having a second curved surface with a projecting portion that is in close contact with the peripheral surfaces of the first and second recovery rollers, the second member being on the other side of the third member; and
   the third member having a third surface and a through hole formed in a central portion of the third member to cause the ejected wire electrode to run in the recovering direction, and coupling the first and second members to form two grooves for forming an air gap with the peripheral surfaces of the first and second recovery rollers, the two grooves being disposed between the first and second curved surfaces to be in contact with the through hole, wherein
   a fluid spout for spouting a fluid into the through hole in the recovering direction is formed in any one of the first, second, and third members, and
   wherein the third surface is not flush with the first curved surface and the second curved surface.

2. The wire aspiration device according to claim 1, wherein the third member has a width in a rotation axis direction of the first and second recovery rollers, corresponding to a maximum range of movement of the wire electrode in the rotation axis direction.

3. The wire aspiration device according to claim 1, wherein the fluid spout is formed in the third member.

4. A wire recovery device comprising:
   the wire aspiration device according to claim 1; and
   the first and second recovery rollers.

5. A wire aspiration device that is placed on an ejection side of first and second recovering conveyer belts that nip a wire electrode having run through an area where a workpiece is subject to electric discharge machining from both sides of the wire electrode and eject the wire electrode, and that aspirates the ejected wire electrode in a recovering direction, the wire aspiration device comprising:
   a first member having a first curved surface with a projecting portion that is in close contact with peripheral surfaces of the first and second recovering conveyer belts, the first member being on one side of a third member, the recovering conveyer belts being laid by first and second recovery rollers that lay the first and second recovering conveyer belts in tensioned states on the ejection side;
   a second member having a second curved surface with a projecting portion that is in close contact with the peripheral surfaces of the laid first and second recovering conveyer belts, the second member being on the other side of the third member; and
   the third member having a third surface and a through hole formed in a central portion of the third member to cause the ejected wire electrode to run in the recovering direction, and coupling the first and second members to form two grooves for forming an air gap with the peripheral surfaces of the laid first and second recovering conveyer belts, the two grooves being disposed between the first and second curved surfaces to be in contact with the through hole, wherein
   a fluid spout for spouting a fluid into the through hole in the recovering direction is formed in any one of the first, second, and third members, and
   wherein the third surface is not flush with the first curved surface and the second curved surface.

6. The wire aspiration device according to claim 5, wherein the third member has a width in a rotation axis direction of the first and second recovery rollers, corresponding to a maximum range of movement of the wire electrode in the rotation axis direction.

7. The wire aspiration device according to claim 5, wherein the fluid spout is formed in the third member.

8. A wire recovery device comprising:
   the wire aspiration device according to claim 5; and
   the first and second recovering conveyer belts.

9. A wire aspiration device that is placed on a carry-out side of a rotary roller changing a direction of a wire electrode that has run through an area where a workpiece is subject to electric discharge machining and carrying out the wire electrode, and that aspirates the carried wire electrode in a conveying direction, the wire aspiration device comprising:
   a first member having a first curved surface that is in close contact with a peripheral surface of the rotary roller, the first member being on one side of a third member;
   a second member having a second curved surface that is in close contact with the peripheral surface of the rotary roller, the second member being on the other side of the third member; and
   the third member having a third surface and a through hole formed in a central portion of the third member to cause the carried wire electrode to run in the conveying direction, and coupling the first and second members to form a groove for forming an air gap with the peripheral surface of the rotary roller, the two grooves being disposed between the first and second curved surfaces to be in contact with the through hole, wherein
   a fluid spout for spouting a fluid into the through hole in the conveying direction is formed in any one of the first, second, and third members, and
   wherein the third surface is not flush with the first curved surface and the second curved surface.

10. The wire aspiration device according to claim 9, wherein the third member has a width in a rotation axis direction of the rotary roller, corresponding to a maximum range of movement of the wire electrode in the rotation axis direction.

11. The wire aspiration device according to claim 9, wherein the fluid spout is formed in the third member.

12. The wire aspiration device according to claim 1, wherein the two grooves are disposed between the first member and the second member, and flat surfaces of the two grooves, respectively, are recessed into the wire aspiration device.

13. The wire aspiration device according to claim 1, wherein the two grooves are configured such that flows of external air are concentrated therein to prevent winding of the wire electrode around the first and second recovery rollers.

14. The wire aspiration device according to claim 1, wherein the first member, the third member, and the second member are aligned in sequence and parallel to an axis of rotation of the first and second recovery rollers.

* * * * *